US009516493B2

(12) United States Patent
Dohner et al.

(10) Patent No.: US 9,516,493 B2
(45) Date of Patent: Dec. 6, 2016

(54) TONE DETECTION FOR INTER-OPERABILITY TESTING (71) Applicant: Apple Inc., Cupertino, CA (US)

(72) Inventors: Adam T. Dohner, Palo Alto, CA (US); Ruben Caballero, San Jose, CA (US); Mohit Narang, Cupertino, CA (US); Xinping Zeng, San Jose, CA (US); Vusthla Sunil Reddy, Sunnyvale, CA (US); Peter M. Agboh, San Francisco, CA (US)

(*) Notice: Subject to any disclaimer, the term of this patent is extended or adjusted under 35 U.S.C. 154(b) by 0 days.

(21) Appl. No.: 14/712,805

(22) Filed: May 14, 2015

(65) Prior Publication Data

US 2016/0227398 A1 Aug. 4, 2016

Related U.S. Application Data

(60) Provisional application No. 62/110,376, filed on Jan. 30, 2015.

(51) Int. Cl.
*H04B 17/00* (2015.01)
*H04W 8/22* (2009.01)
*H04R 29/00* (2006.01)

(52) U.S. Cl.
CPC .............. *H04W 8/22* (2013.01); *H04R 29/00* (2013.01)

(58) Field of Classification Search
CPC ............ H04B 5/00; H04B 17/00; H04W 8/22; H04W 24/00; H04W 24/08; H04R 29/00
USPC .............. 455/41.1, 67.11, 67.14, 67.7, 226.1
See application file for complete search history.

(56) References Cited

U.S. PATENT DOCUMENTS

| 2006/0041415 | A1* | 2/2006 | Dybas | H04L 41/145 703/13 |
| 2007/0279212 | A1* | 12/2007 | Hong | G06K 7/0008 340/514 |
| 2015/0038130 | A1* | 2/2015 | Mao | H04W 8/22 455/418 |

* cited by examiner

*Primary Examiner* — Tuan Pham
(74) *Attorney, Agent, or Firm* — Downey Brand LLP (57) ABSTRACT

This application relates to systems, methods, and apparatus for testing operability of a mobile device with a reader device. In some embodiments, a testing system is set forth for automatically placing the mobile device proximate to the reader device in order to initiate a wireless transaction between the mobile device and the reader device. Depending on whether the mobile device is determined to be operable with the reader device, the testing system can automatically place the mobile device proximate to another reader device for testing. In this way, reductions in testing time can be manifested as a result of automating the testing process.

14 Claims, 9 Drawing Sheets

TONE DETECTION FOR INTER-OPERABILITY TESTING

CROSS-REFERENCE TO RELATED APPLICATIONS

The present application claims the benefit of priority under 35 U.S.C §119(e) to U.S. Provisional Application No. 62/110,376, entitled "TONE DETECTION FOR INTER-OPERABILITY TESTING" filed Jan. 30, 2015, the content of which is incorporated herein by reference in its entirety for all purposes.

FIELD

The described embodiments relate generally to near-field communication (NFC) device testing. More particularly, the present embodiments relate to systems, methods, and apparatus for efficiently testing an NFC device with multiple different reader devices.

BACKGROUND

Device manufacturing has become exceedingly complicated over time. Because of the operation of certain devices, stringent tests must be passed in order for the devices to be approved for consumer use. The integration of certain device components has made such tests tedious, leaving limited options for streamlining the testing process. In some cases, components responsible for wireless communication must be tested to ensure their ability to accurately send and receive data. In these cases, a client device and a reader device are often tested using methods that can be time consuming, thereby causing delays in the manufacture and release of products. In the case of NFC devices, when the client device must be tested with multiple different reader devices, delays are exacerbated by certain measures required to sequentially maneuver the client device proximate to multiple different reader devices.

SUMMARY

This paper describes various embodiments that relate to systems, methods, and apparatus for testing inter-operability of mobile devices with reader devices. In some embodiments, a testing system is set forth. The testing system can include a robotic assembly configured to suspend a mobile device proximate to a reader device. The testing system can further include a computing device and a microphone configured to capture a tone generated by the reader device. The computing device can be configured to perform steps that include capturing, via the microphone, the tone generated by the reader device as a result of a test transaction occurring between the reader device and the mobile device. The steps can further include determining whether the mobile device is operable with the reader device based on a comparison between the captured tone and a pre-recorded tone. Additionally, the steps can include moving the mobile device to a different reader device when the computing device determines the mobile device is operable with the reader device.

In other embodiments, a method is set forth for performing inter-operability testing of a near-field communications (NFC) device using a testing system. The method can include a step of processing a captured tone generated by a reader device as a result of a wireless transaction between the NFC device and the reader device. Furthermore, the method steps can include combining the captured tone with a pre-recorded pass tone to generate a resulting waveform, and comparing a peak of the resulting waveform to a pass tone threshold. Finally, the steps can include, when the peak is equal to or greater than the pass tone threshold, determining that the NFC device is operable with the reader device.

In yet other embodiments a computing device is set forth for testing the inter-operability of a near-field communication (NFC) device with a reader device. The computing device can include a processor and a memory. The memory can store instructions that when executed by the processor cause the computing device to perform steps that include receiving, via a microphone communicatively coupled to the computing device, a captured tone resulting from a transaction between the NFC device and the reader device. Furthermore, the steps can include determining that the NFC device is operable with the reader device when a peak of a signal derived from a combination of the captured tone and a pre-recorded tone is within a threshold range.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of systems, methods, and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

The embodiments discussed herein relate to inter-operability testing of mobile devices with reader devices. Because many mobile devices incorporate various wireless functions, each function should be tested in order to determine inter-operability with other devices. For example, many mobile devices include near-field communication (NFC) circuits for conducting transactions with NFC reader devices. However, because of the variety of NFC reader devices available to mobile device users, it is imperative that an NFC circuit be tested with each type of NFC reader device to gauge inter-operability with each type of an NFC reader device. In order to test a mobile device's NFC circuit, a mobile device can be sequentially tested with multiple reader devices by manually placing the mobile device proximate to each reader device. Unfortunately, manual placement can be time consuming and potentially result in inaccuracies when confirming inter-operability of the mobile device with each reader device. Therefore, by automating inter-operability testing, substantial improvement in total test time can be realized.

The embodiments disclosed herein relate to systems, methods, and apparatus for automating inter-operability testing. In some embodiments, a testing system is set forth that can automatically position a mobile device proximate to a reader device in order to perform inter-operability testing of the mobile device with the reader device. Positioning of the mobile device can be performed using a robot that is controlled by a computer. For example, the computer can direct the robot to position the mobile device proximate to a first reader device for inter-operability testing, and when the inter-operability testing is complete, the computer can direct the robot to position the mobile device proximate to a second reader device for additional inter-operability testing.

The testing system can include a microphone or other suitable audio-capturing device for capturing tones output by the reader devices. The microphone can be attached to the robot, the mobile device, or other suitable portion of the testing system for enabling the microphone to capture tones from a reader device under testing. The tones are used as indicators for determining whether a transaction occurring between the mobile device and the reader device was a successful pass or fail transaction. For example, some reader devices generate a pass tone when a transaction is successful and a fail tone when a transaction is not successful, and each pass tone and fail tone can vary for each reader device. Other reader devices generate a pass tone when a transaction is successful and refrain from generating any tone when a transaction is not successful. In order to handle the variations in tones for each reader device, the computer of the testing system can store information about different reader devices. For example, the computer can store sound data recorded by the microphone in order to create a look-up table of pass tones and fail tones for different reader devices. The look-up table can be referenced during testing of the reader devices in order to confirm whether a tone output by a reader device is a pass tone, fail tone, or otherwise a correct or incorrect tone for the transaction being performed. Furthermore, a log can be generated for storing testing-related information such as reader identifiers, different results of testing, and a location or position of a mobile device during testing. In this way, the computer can track where the mobile device is relative to the reader device for each test performed at the reader device.

In some embodiments, inter-operability testing can be performed in different stages. For example, during one stage, a look-up table is generated using data recorded during initial testing of each reader device. During another stage, a mobile device can be automatically tested with any number reader devices without any input from an operator. For example, in some embodiments, the look-up table is generated or received by the computer of the system for storing tones and thresholds corresponding to each reader device to be tested. An index or entry for a reader device can be created in the look-up table in order to provide a reference location for data generated during the initial inter-operability testing of each reader device. During initial testing, the computer can instruct a robot of the testing system to position a mobile device and a microphone proximate to the reader device. Once proximate to the reader device, the mobile device can conduct a transaction between the reader device and the mobile device in order to cause a pass or fail transaction to occur. The transaction can be conducted via an NFC circuit of the mobile device, thereby allowing the transaction to occur wirelessly with the reader device. When the transaction is complete, the reader device may output a tone for indicating to a user of the mobile device whether transaction was a successful pass or fail transaction. The tone is captured by the microphone of the testing system and a determination is made whether the tone was a pass tone or a fail tone. This determination can be made by an operator of the testing system or the testing system itself. For example, in the case of a new or previously uncharacterized reader device, the operator can provide an input to an interface of the computer indicating whether the tone was a pass tone or a fail tone. If the operator indicates that the tone was a pass tone, then the computer can reference the look-up table to determine whether a pass tone already exists in the look-up table (i.e., the reader device was previously tested and a pass tone was captured by the microphone during testing). If the pass tone does already exist in the look-up table, then the testing system can subsequently perform an unsuccessful transaction in order to cause the reader device to output a fail tone. If the pass tone does not exist in the look-up table, then the look-up table can be updated with the pass tone.

In order to update the look-up table with the pass tone from the reader device being tested, the pass tone and/or a pass threshold are stored in the look-up table. The pass tone can be stored directly into the look-up table, and/or the pass tone can be processed before being stored into the look-up table. For example, the pass tone can be cropped in order to isolate the characteristics of the pass tone that differentiate the pass tone from other tones or noise. Additionally, the pass tone can be normalized in order to promote consistency among captured tones. For example, the microphone can be at different locations relative to a reader device for each test, thereby causing the amplitude of each captured tone to vary. Normalization can therefore improve the reliability of each test by modifying the amplitude of each captured tone to be more uniform relative to other captured tones.

The pass threshold refers to a threshold generated based on a pass tone captured by the microphone and confirmed as being a pass tone by the operator or the computer. Generation of the pass threshold can be performed in a variety of ways. For example, once the computer determines that the pass tone does not exist in the look-up table, an auto-correlation of the pass tone (or the processed pass tone) can be performed to provide a basis for the pass threshold. Auto-correlation refers to the cross-correlation of a signal with itself. Equation (1) below illustrates how the auto-correlation of $f(t)$ is derived to obtain the resulting auto-correlated signal $G(t)$ where $\bar{f}$ is the complex conjugate of $f$.

$$G(t)=\int_{-\infty}^{\infty} f(t)\bar{f}(t-\tau)d\tau \quad (1)$$

The pass tone can be the function $f(t)$ of equation (1) and the pass threshold can be based on the resulting auto-correlated signal $G(t)$. The resulting auto-correlated signal $G(t)$ can have one or more peaks, and at least one of the peaks can be used as a basis for the pass threshold. For example, a value for the maximum peak of the signal $G(t)$ can be stored by the computer as a pass threshold in the look-up table. Alternatively, the pass threshold can be set to a value relative to the maximum peak, such as a percentage or fraction of the maximum peak. Once the pass threshold is stored in the look-up table, the computer can use the pass threshold to test any mobile device with the reader device and determine whether the mobile device is operable with the reader device, as further discussed herein. In some embodiments, the computer can attempt to conduct a failed transaction with the reader device in order to cause the reader device to output a fail tone. In this way, if the computer does successfully conduct a failed transaction that results in the generation of a fail tone, the look-up table can be updated with the fail tone and a fail threshold for that particular reader device.

A failed transaction is one that does not result in a pass tone being output by the reader device. For example, the reader device can be programmed to either not output a tone or output a fail tone when a failed transaction occurs. If the reader device outputs a fail tone, the lookup table can be updated accordingly. During a failed transaction, the microphone of the testing system can capture whatever audio was exhibited as a result of the failed transaction. Furthermore, the operator can provide an input to the interface of the computer indicating that no pass tone or a fail tone was output by the reader device. In response to this input from the operator, the computer can access the look-up table to determine whether a pass tone is stored in the look-up table. If no pass tone is stored in the look-up table, the computer can revert back to attempting a successful transaction in order to cause a pass tone to be output by the reader device so that the look-up table can be updated with a pass tone and pass threshold. If a pass tone is stored in the look-up table for the reader device, the computer can compare the audio captured during the failed transaction with the pass tone or pass threshold stored in the look-up table. For example, a cross-correlation of the captured audio with the pass tone can be performed as a method for comparing the captured audio with the pass tone or pass threshold. Cross-correlation refers to the integration of a product of a complex conjugate of a first signal with a time-lagged second signal. Equation (2) below illustrates how the cross-correlation of $m(t)$ and $n(t)$ is derived to obtain the resulting cross-correlated signal $P(\tau)$. According to equation (2), $\bar{m}(t)$ is the complex conjugate of $m(t)$ and $n(t+\tau)$ is the time-lagged version of $n(t)$.

$$P(\tau)=\int_{-\infty}^{\infty} \bar{m}(t)n(t+\tau)dt \quad (2)$$

A peak of the resulting cross-correlated signal $P(\tau)$ can be compared to the pass threshold. If the peak of the resulting cross-correlated signal $P(\tau)$ associated with a pass transaction is less than the pass threshold, the computer can move the mobile device to the next reader device to be tested without storing a fail tone and/or a fail threshold. However, if the peak of the resulting cross-correlated signal $P(\tau)$ is greater than the pass threshold for a pass transaction, and the operator has indicated the captured tone is not a pass tone, then a false positive has occurred. In other words, the captured tone has caused a peak of the cross-correlated signal to exceed the pass threshold when captured tone was indicated to not be a passing tone, thereby causing the false positive. This circumstance can indicate that the reader device has output a fail tone.

A false positive can be handled by the testing system in a variety of ways. For example, a fail tone and/or fail tone threshold can be stored in the look-up table as a result of the false positive occurring. Subsequently, during a test of the reader device that provided the fail tone, the fail tone and/or fail tone threshold will be available for comparison with a captured tone. The fail tone and fail tone threshold can be generated and stored in the same manner as the pass tone and pass tone threshold discussed herein. For example, a peak of an auto-correlated fail tone can be used as a basis for the fail tone threshold. Additionally, the fail tone stored in the look-up table can be a cropped and/or normalized version of the fail tone captured during testing of the reader device. Compared to the auto-correlated pass tone, an auto-correlated fail tone can have a higher peak amplitude when the fail tone is merely the pass tone repeated sequentially. As a result, a fail tone threshold can be greater than a pass tone threshold, and can be used thereafter to confirm a failed transaction has successfully occurred. For example, after updating the look-up table with the fail tone threshold and fail tone, the computer can attempt to conduct a failed transaction between the mobile device and the reader device. The computer can confirm the failed transaction by cross-correlating a captured tone output from the reader device during the failed transaction with the fail tone. If the cross-correlation results in a signal having an amplitude greater than or equal to the fail tone threshold, then the computer can update a log to indicate the mobile successfully completed a failed transaction with the reader device.

Once a pass transaction and/or a fail transaction have been performed and confirmed as accurate by the operator or computer, and the look-up table has been updated accordingly, the computer can direct the robot to position the mobile device proximate to the next reader device for further updating the look-up table with a tone(s) and/or threshold(s) corresponding to the next reader device. This transition of the mobile device between reader devices can occur automatically as a result of a pass and/or a fail transaction being confirmed by the operator or computer. Once the look-up table has been completely updated for all reader devices, further inoperability testing between mobile devices and reader devices can be performed automatically by the testing system without operator input. In this way, numerous reader devices can be quickly and accurately tested as operable with multiple mobile devices thereby expediting and improving the testing process.

For example, once the look-up table has been generated and sufficiently updated for a number of reader devices to be tested, the testing system can position the mobile device proximate to a reader device to initiate a transaction. As a result of initiating the transaction, the reader device can output a tone, which can be recorded by the microphone of the testing system. A sound clip corresponding to the recording of the tone can be cross-correlated with a reference tone (i.e., a previously recorded pass tone, fail tone, or other tone) stored in a look-up table of the computer of the testing system. If a waveform resulting from the cross-correlation has an amplitude equal to or greater than a reference threshold (i.e., a previously generated pass threshold, fail threshold, or other threshold), then a log of the computer can be updated to indicate that the mobile device is operable with the reader device. Otherwise, the log can be updated to indicate that the mobile device is not operable with the reader device.

In some embodiments of the testing system, the log can store a location of the mobile device for each test performed with a reader device. Therefore, the mobile device can be tested at multiple positions relative to the reader device, and location data corresponding to the multiple positions can be stored in the log. In this way, the inter-operability of the mobile device with the reader device can be tracked for various different locations of the mobile device. Using the location data, the testing system can determine what locations should be tested again for certain reader devices. Additionally, the testing data derived from the different test locations can be used to optimize accuracy of transactions between mobile devices and reader devices.

These and other embodiments are discussed below with reference to FIGS. 1-9; however, those skilled in the art will readily appreciate that the detailed description given herein with respect to these figures is for explanatory purposes only and should not be construed as limiting.

Figure 1:
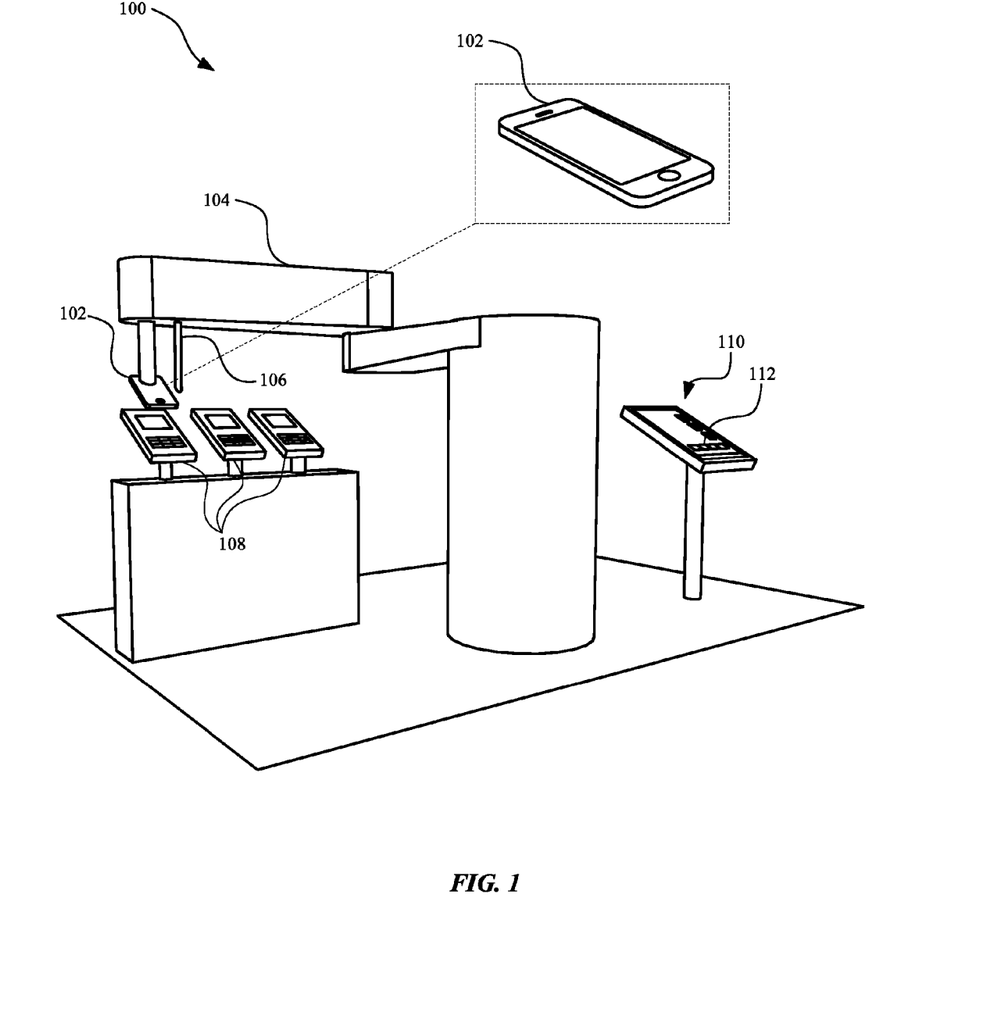
FIG. 1 illustrates a perspective view of a testing system for performing inter-operability testing of a mobile device according to some embodiments discussed herein.

FIG. 1 illustrates a perspective view of a testing system for performing inter-operability testing of a mobile device 102 according to some embodiments discussed herein. Specifically, the testing system can be used to test near-field communication (NFC) transactions between the mobile device 102 and various reader devices 108. In some embodiments, the testing system can include a computer 110 for controlling the movement of a robot 104 in order to place the mobile device 102 proximate to one or more of the reader devices 108. The mobile device 102 can be considered proximate to the reader device 108 when a distance between the mobile device 102 and the reader device 108 is at least enough to effectuate a wireless transaction between the mobile device 102 and the reader device 108. In response to the wireless transaction, the reader device 108 can output a tone indicative of whether the wireless transaction was a transaction that passed or failed. The tone can be captured by a microphone 106 that is hardwired or wirelessly connected to the computer 110. When using the testing system to generate a look-up table for the reader devices, an operator of the testing system can provide an input to an interface 112 of the computer 110 indicating that the tone was either a pass tone or a fail tone. However, once the look-up table is generated, the computer 110 can determine whether the tone was a pass tone or a fail tone automatically without operator input by referencing the look-up table, as discussed herein. If the tone or tones provided by the reader device 108 is consistent with the wireless transaction(s) occurring between the mobile device 102 and the reader device 108, the inter-operability of the mobile device 102 and the reader device 108 can be confirmed. In response, the computer 110 can instruct the robot 104 to position the mobile device 102 proximate to the next reader device 108 to be tested with the mobile device 102.

In some embodiments, multiple mobile devices 102 can be coupled to one or more robots 104 in order to expedite the testing process. In other embodiments, multiple reader devices 108 can be tested concurrently with a mobile device 102. The reader devices 108 can be any suitable reader devices 108 for conducting wireless transactions with a mobile device 102. For example, the reader devices 108 can be devices for conducting payment transactions or authenticating the identity of a user. Additionally, the mobile device 102 can be any suitable portable computing device capable of conducting wireless transactions with a reader device 108. For example, the mobile device 102 can be a cellular device, media player, tablet computer, laptop computer, watch, or other wearable computing device. The microphone 106 of the testing system can be any suitable microphone 106 for capturing sound. For example, in some embodiments the microphone 106 can be an active or passive microphone 106. Additionally, the testing system can include multiple microphones 106 for capturing sounds from one or more reader devices 108 and/or one or more mobile devices 102 concurrently or sequentially.

Figure 2:
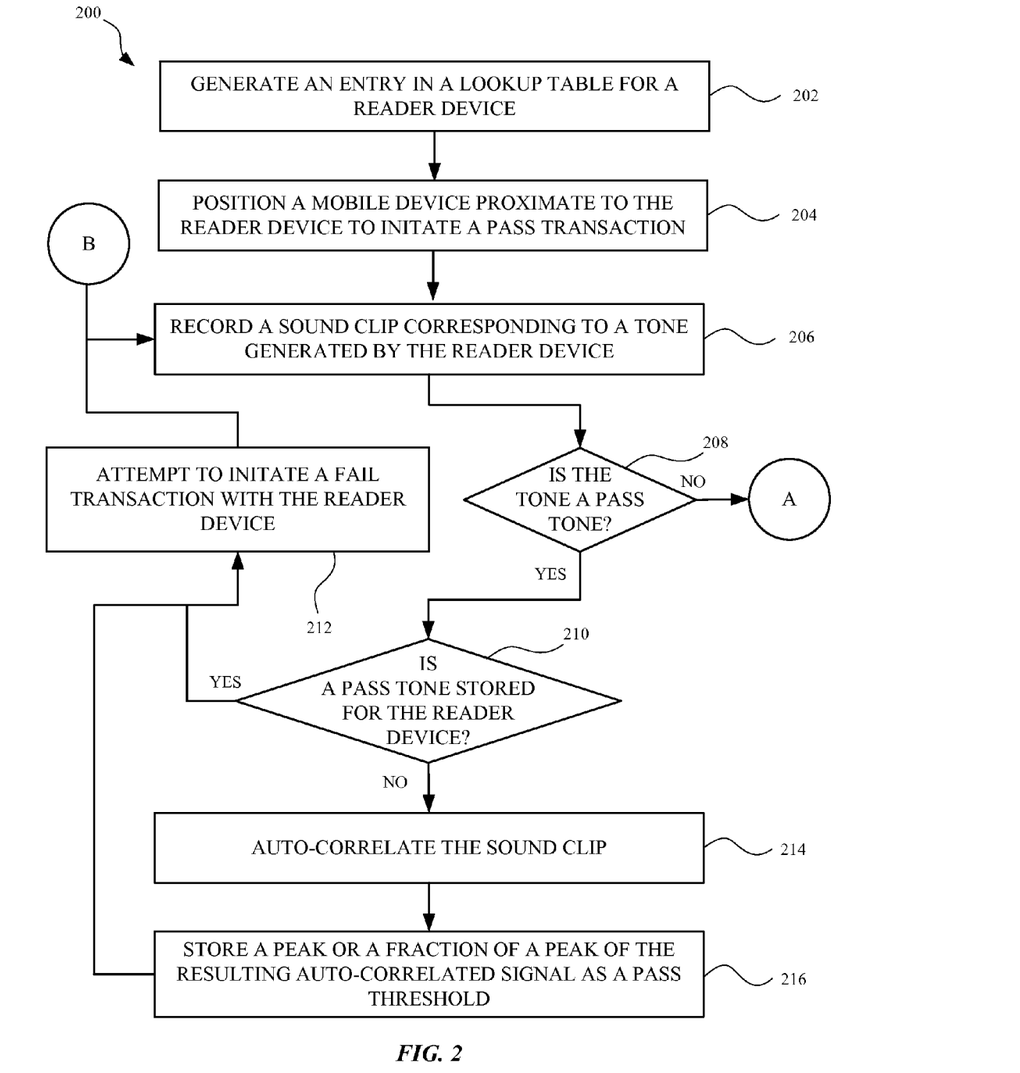
FIG. 2 illustrates a method for testing the inter-operability of the mobile device with different reader devices.

FIG. 2 illustrates a method 200 for generating a look-up table for testing the inter-operability of the mobile device 102 with reader devices 108. The method 200 can be performed by the computer 110 or any other suitable device capable of performing wireless tests. The method 200 can include a step 202 of generating an entry in a lookup table, wherein the entry corresponds to a reader device 108 to be tested. In some embodiments, the computer 110 can store multiple lookup tables or logs, and each log and look-up table can be associated with different aspects of the testing process. The method 200 can further include a step 204 of positioning the mobile device 102 proximate to the reader device 108 to initiate a pass transaction with the reader device 108. In some embodiments, the wireless transaction is performed using an NFC circuit of the mobile device 102. In response to the wireless transaction, the reader device 108 can output a tone. At step 206 of the method 200, a sound clip corresponding to the tone is recorded. The recording can be performed by the microphone 106 and the sound clip can thereafter be stored by the computer 110.

The sound clip can be stored in the look-up table with or without being processed by the computer 110. When the sound clip is stored post-processing, the processing performed on the sound clip can include any suitable sound processing algorithm or function. For example, in some embodiments, the recorded sound clip is cropped in order to isolate the unique or signature portion of the tone from the reader device 108. Furthermore, the recorded sound clip can be normalized in order that the amplitude of the sound clip is substantially uniform for a majority of the sound clip, and/or relative to one or more other recorded sound clips generated during testing.

The method 200 can also include a step 208 in which a determination is made whether the tone is a pass tone or not. The determination can be made based on an input provided to the computer 110 of the testing system. The input can be received from an operator of the testing system discussed herein. For example, the interface 112 of the computer 110 can be programmed to receive inputs that indicate to the computer 110 whether the tone is a pass tone, fail tone, and/or other tone. In this way, the operator of the testing system is provided with an efficient mechanism for communicating to the computer 110 that the operator heard the tone and confirms what type of tone it is. In some embodiments, the determination of whether the tone is a pass tone or other tone is performed by the computer 110. For example, the computer 110 can include a machine learning algorithm that can autonomously identify whether a tone is a pass tone or not after receiving some data related to what tones are pass tones and what tones are not pass tones.

Figure 3:
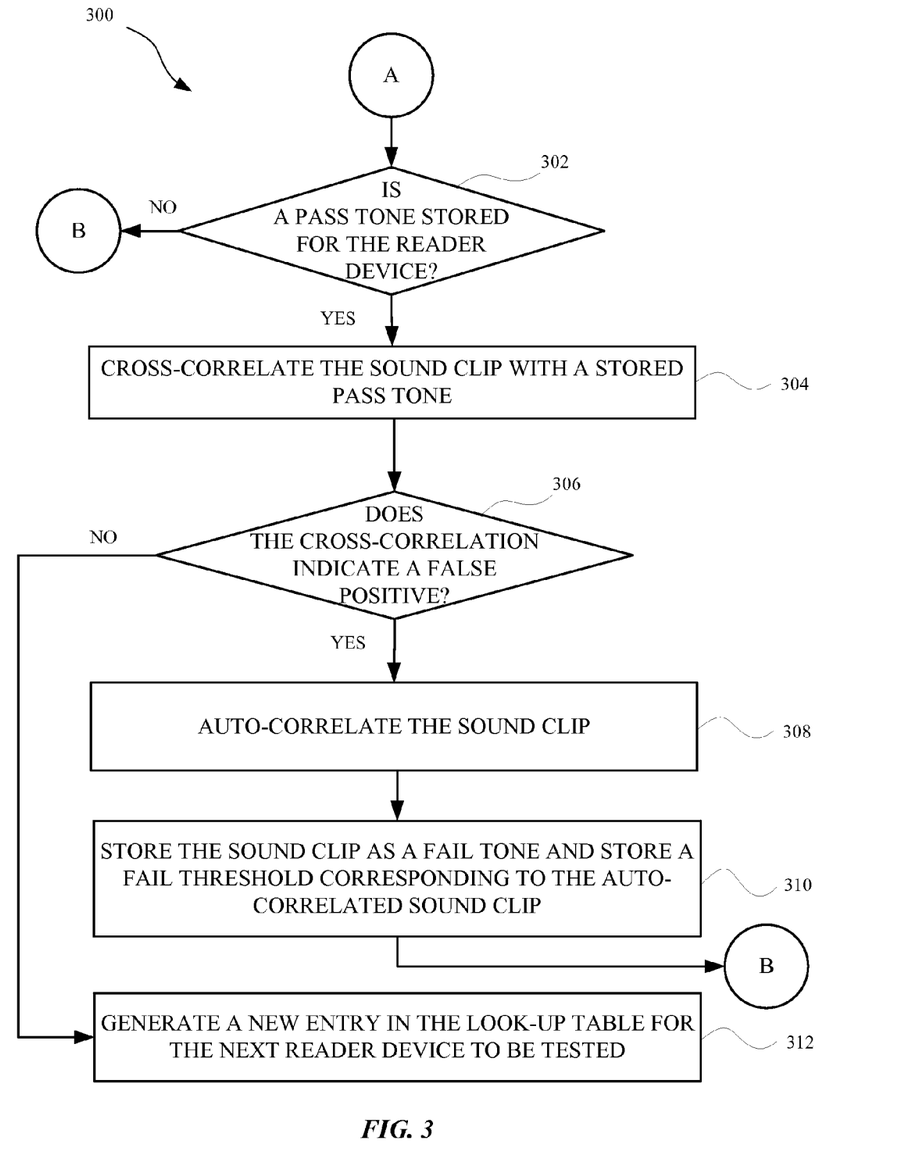
FIG. 3 illustrates a continuation of the method illustrated in FIG. 2 for testing the inter-operability of the mobile device with different reader devices.

If the tone is not a pass tone then the method 200 proceeds to step 302 set forth in FIG. 3 (it should be noted that "A" indicates a transition between step 208 of FIG. 2 and step 302 of FIG. 3). Thereafter, the testing system can confirm whether a fail tone or non-pass tone was generated by the reader device 108 as a result of an attempt for perform a fail transaction, as further discussed herein. If the tone is a pass tone, then at step 210, a determination is made whether a pass tone is stored for the reader device 108. If a pass tone is stored for the reader device 108 then at step 212, a fail transaction is initiated with the reader device 108. Thereafter, step 206 is repeated in order to record a fail tone generated by the reader device 108 as a result of initiating the fail transaction. Following step 206, when the fail tone or no tone is recorded, then at step 208 a determination is made whether the tone is a pass tone, and because the tone is not a pass tone, step 302 of FIG. 3 is executed. Otherwise, referring to step 210, if no pass tone is stored for the reader device 108 being tested, then step 214 is performed.

At step 214, the sound clip recorded at step 206 is auto-correlated. Auto-correlation is a cross-correlation of a signal, such as a sound clip, with itself. By auto-correlating the sound clip, a pass threshold can be derived. For example, the auto-correlation of the sound clip results in a waveform having one or more peaks, each having an amplitude of a certain value. By identifying the maximum amplitude of the waveform, a pass threshold corresponding to the maximum amplitude can be stored in the look-up table. The pass threshold can also be based on percentage or fraction of the maximum amplitude of the wave form. Thereafter, when subsequently testing the recording device 108, a subsequent tone output by the reader device 108 can be cross-correlated with the previously stored pass signal. Using a peak of the resulting waveform from the cross-correlation, the subsequent tone can be accurately authenticated as a pass tone or non-passing tone. Upon generation of the pass threshold, at step 216, the computer 110 can store the pass threshold derived from the auto-correlation of the sound clip. Next, at step 212, the testing system can attempt to initiate a fail transaction with the reader device 108, which can ultimately result in the execution of step 302 of FIG. 3, as discussed herein.

FIG. 3 illustrates a method 300 for testing the interoperability of the mobile device 102 with reader devices 108. Specifically, method 300 is a continuation of method 200 and is connected to method 200 by way of transitions "A" and "B" illustrated in FIGS. 2 and 3. Transition "A" is a continuation from step 208 of FIG. 2 and leads to step 302, which is a determination of whether a pass tone is stored for the reader device 108 being tested. If no pass tone is stored for the reader device 108, then according to transition "B," step 206 from method 200 is repeated, as further discussed herein. If a pass tone is stored for the reader device 108, then at step 304, a cross-correlation of the sound clip with a stored pass tone and/or fail tone is performed. Cross-correlation of a first and a second signal can refer to the integration of a product of a complex conjugate of the first signal with a time-lagged version of the second signal, as discussed with respect to equation (2) herein. Once the cross-correlation has been performed, at step 306, a determination is made whether a waveform resulting from the cross-correlation indicates a false positive. A false positive can refer to when a peak of the waveform resulting from the cross-correlation is at or above the pass threshold generated at step 216 or a fail threshold, but the tone emitted from the reader device 108 was not indicated as being a pass tone or a fail tone, respectively. Additionally, false positives can occur when the reader device 108 emits a fail tone that is similar to a pass tone that the reader device 108 emits. For example, when a pass transaction occurs, the reader device 108 may output a beep sound of a predetermined frequency, and when a fail transaction occurs the reader device 108 may output multiple beeps of the same or similar predetermined frequency. As a result, the waveform resulting from a cross-correlation of the fail tone and pass tone can include peaks that are similar to and/or greater than the wave form resulting from the autocorrelation of the pass tone.

In order to handle a false positive, at step 308, the sound clip that caused the false positive is auto-correlated. At step 310, the sound clip is stored in the look-up table as a fail tone. Additionally, at step 310, a fail threshold corresponding to the auto-correlated sound clip is stored as an entry in the look-up table corresponding to the reader device. The stored fail tone can be a processed or unprocessed version of the sound clip. For example, the sound clip can be processed by clipping portions of the sound clip that are ambient noise not associated with the tone generated by the reader device 108. Additionally, the sound clip can be normalized as discussed herein. Furthermore, any of the sound clips discussed herein can be filtered using any suitable wave filters for improving detectability of certain tones within a recorded sound clip. Furthermore, any of the cross-correlation and auto-correlation techniques discussed herein can be performed in the frequency domain using at least a Fourier transform of the captured tone and/or the pre-recorded pass/fail tone. Once the fail tone and the fail threshold have been stored by the computer 110 in the look-up table for subsequent tests of reader devices 108, then, via transition "B," step 206 is repeated from method 200.

However, if at step 306 a false positive is not indicated by the cross-correlation, then step 312 is performed. In some embodiments, upon completion of step 310, step 312 can be performed instead of repeating step 206. At step 312, a new entry in the look-up table can be generated for the next reader to be tested. In this way, an entry for each reader device 108 that has been tested will be stored in the look-up table. Each entry for each reader device 108 can be associated with a pass threshold, pass tone, fail threshold, fail tone, entry identifier, data describing the reader device 108, and/or data describing the mobile device 102 tested with the reader device 108. Furthermore, any suitable data for improving testing processes of NFC devices can be included in the log and/or look-up table of entries stored by the computer 110.

Figure 4A:
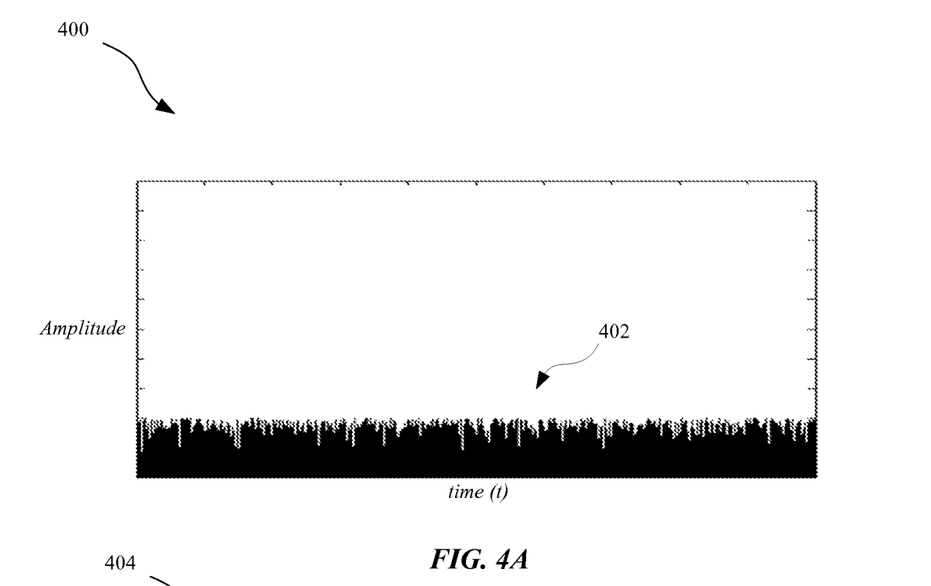
FIGS. 4A and 4B illustrate examples of a signal and an autocorrelation of the signal used for setting a pass threshold for a reader device, discussed herein.
Figure 4B:
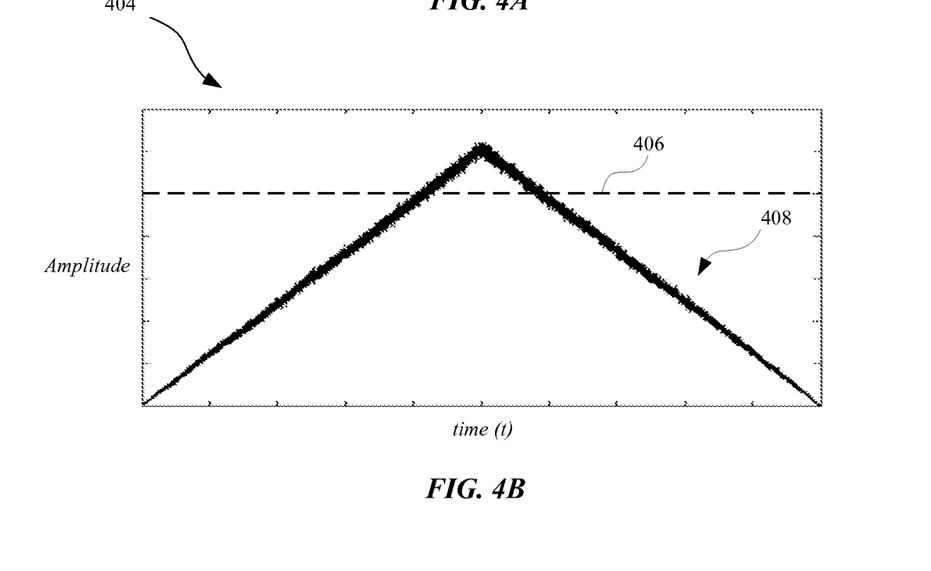

FIGS. 4A and 4B illustrate examples of a signal and an autocorrelation of the signal used for setting a pass threshold for a reader device, as discussed herein. Specifically, FIG. 4A illustrates a plot 400 of a sound clip 402 that can be captured by the microphone 106 of the testing system. The sound clip 402 can represent a pass tone emitted from a reader device 108 before or after being processed (e.g., cropped and/or normalized). The sound clip 402 can thereafter be auto-correlated according to the methods discussed herein. FIG. 4B illustrates a plot 404 of a waveform 408 resulting from the auto-correlation of sound clip 402. In some tests, the auto-correlation can result in a signal having a single maximum peak amplitude or apex as illustrated in plot 404. Using the peak amplitude of the waveform 408, a pass threshold 406 can be set relative to the peak amplitude. For example, the pass threshold 406 can be set equal to the peak amplitude or any suitable value less than the peak amplitude (e.g., at 90% of the peak amplitude). As a result, the pass threshold 406 can thereafter be used by the testing system to automatically verify that a tone emitted from the reader device 108 was a pass tone based on the pass threshold 406, as discussed herein.

Figure 5A:
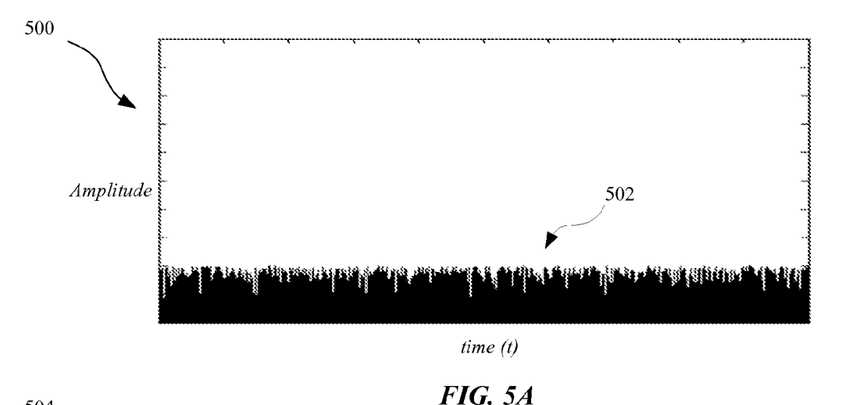
FIGS. 5A-5C illustrate examples of a cross-correlation of a pass tone with a captured tone to determine whether the captured tone corresponds to a pass transaction.
Figure 5B:
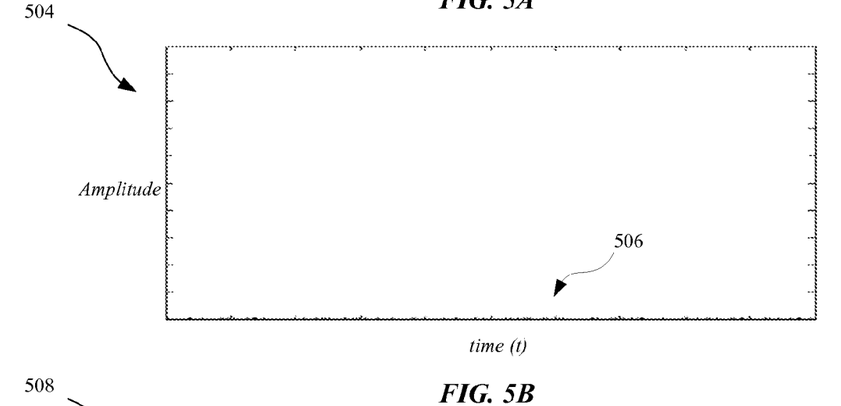
Figure 5C:
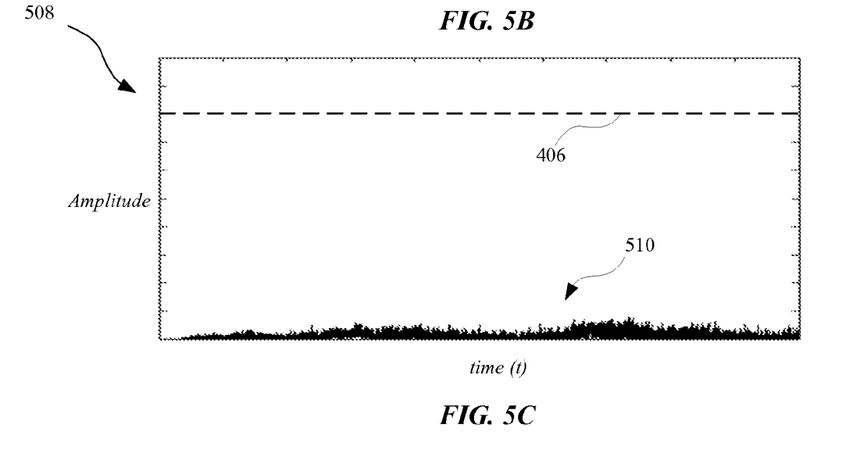

FIGS. 5A-5C illustrate examples of a cross-correlation of a pass tone 502 with a captured tone 506 to determine whether the captured tone 506 corresponds to a pass transaction. Specifically, FIG. 5A illustrates a plot 500 of the pass tone 502 that is captured when the mobile device 102 is positioned proximate to the reader device 108 by the robot 104, thereby initiating a pass transaction. As a result, the pass tone 502 is emitted by the reader device 108, captured by the microphone 106 of the testing system, and stored in a look-up table, as further discussed herein. Subsequently, during testing of the same reader device 108, the mobile device 102 can be automatically positioned proximate to the reader device 108 by the robot 104 to initiate a pass or a fail transaction. As a result, a captured tone 506 is emitted, as illustrated in plot 504 of FIG. 5B. The captured tone 506 can represent audio captured by the microphone 106 when no tone is emitted by the reader device 108 or a fail tone is emitted by the reader device 108. Upon the captured tone 506 being captured for analysis by the testing system, a cross-correlation of the pass tone 502 and the captured tone 506 can be performed by the computer 110. Plot 508 of FIG. 5C illustrates a waveform 510 resulting from the cross-correlation of the pass tone 502 and the captured tone 506. According to plot 508, the amplitude of the waveform 510 never reaches or exceeds the pass threshold 406 indicating that the captured tone 506 is not a pass tone. As a result, if the transaction that caused the captured tone 506 to be emitted by the reader device 108 was intended to be a fail transaction, then the testing system can update the log to indicate that a successful fail transaction was completed.

Figure 6A:
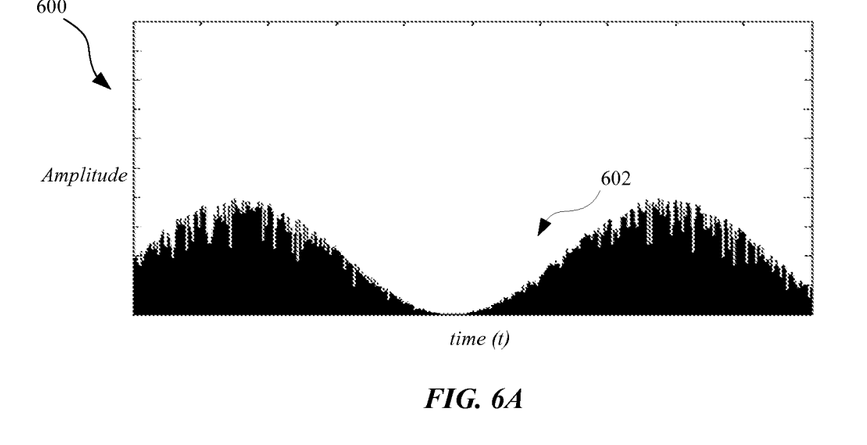
FIGS. 6A and 6B illustrate examples of a signal and auto-correlation of the signal used for setting a fail threshold for the testing system discussed herein.
Figure 6B:
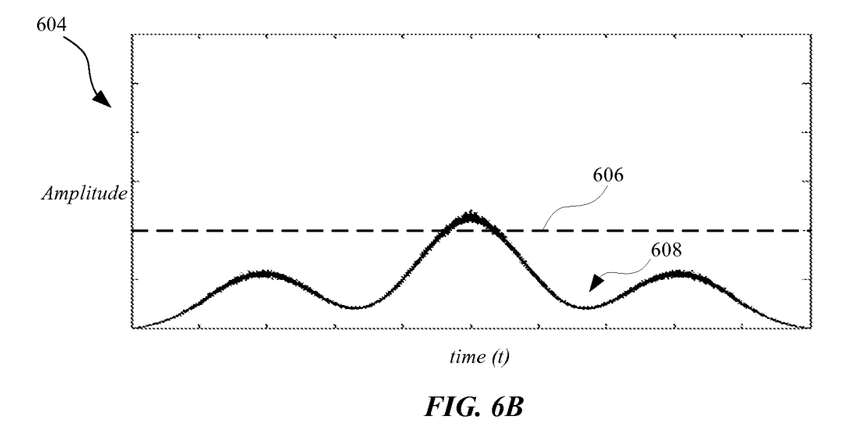

FIGS. 6A and 6B illustrate examples of a signal and auto-correlation of the signal used for setting a fail threshold 606 for the testing system discussed herein. Specifically, FIG. 6A illustrates a plot 600 of a fail tone 602 that can be emitted from the reader device 108. For example, when the mobile device 102 is proximate to the reader device 108 in order to conduct a wireless transaction, and the transaction fails or otherwise does not pass, some reader devices 108 are programmed to output a tone indicating the transaction failed. However, some reader devices 108 are not programmed to do this. Regardless, the testing system can be programmed to handle this situation by capturing the fail tone 602, processing the fail tone 602 as discussed herein, and auto-correlating the fail tone 602 in order to generate a fail threshold 606. Thereafter, the fail threshold 606 can be stored in the look-up table for future testing of the reader device 108 that generated the fail tone 602. FIG. 6B illustrates a plot 604 of a waveform 608 resulting from the auto-correlation of fail tone 602 by computer 110. The computer 110 can identify one or more peaks of the waveform 608 and generate the fail threshold 606 based on the peak. For example, the fail threshold 606 can be set equal to a maximum amplitude of the waveform 608 or any suitable value below the peak (e.g., 90% of the peak) of the waveform 608. In some embodiments, the fail threshold 606 is greater than the pass threshold 406. In this way, during subsequent testing of the reader device 108, if a false positive occurs as a result of comparing a waveform to the pass threshold 406, the waveform can be compared to the fail threshold 606. By comparing the waveform to the fail threshold 606, the testing system can confirm whether the false positive is indicative of inoperability of the mobile device 102 with the reader device 108. For example, if the testing system intended to conduct a failed transaction, and a cross-correlation of a resulting tone and stored fail tone resulted in a waveform having a peak greater than both the pass threshold 406 and fail threshold 606, the mobile device 102 can be considered operable with the reader device 108. Alternatively, if the testing system intended to conduct a fail transaction, and a cross-correlation of a resulting tone and stored fail tone resulted in a waveform having a peak less than the fail threshold 606, the mobile device 102 can be considered inoperable with the reader device 108.

Figure 7A:
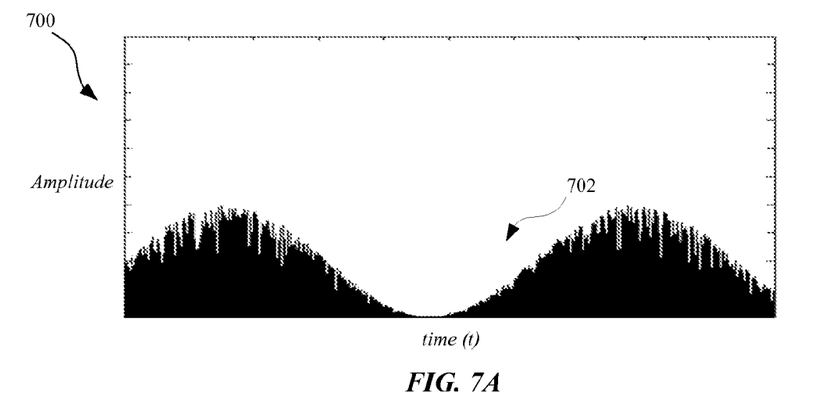
FIGS. 7A-7C illustrates examples of a cross-correlation of a fail tone with a captured tone to determine whether the captured tone corresponds to a fail transaction.
Figure 7B:
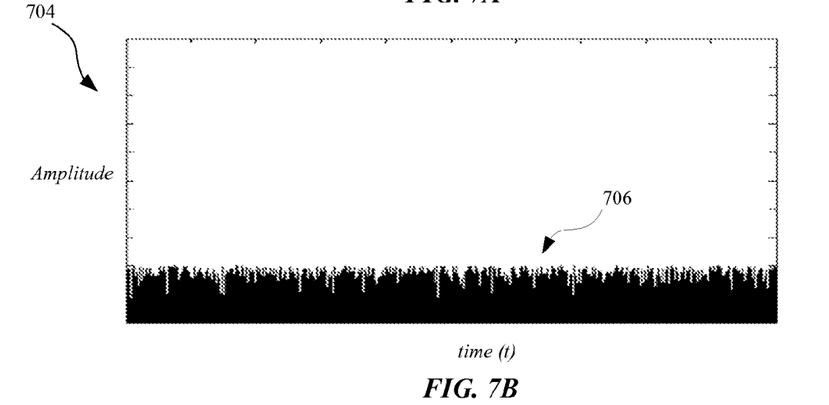
Figure 7C:
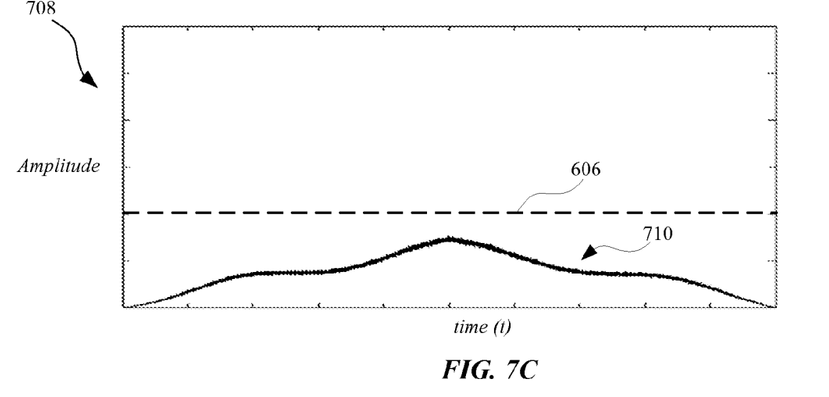

FIGS. 7A-7C illustrates examples of a cross-correlation of a fail tone 702 with a captured tone 706 to determine whether the captured tone 706 corresponds to a fail transaction. Specifically, FIG. 7A illustrates a plot 700 of a fail tone 702 that is captured when the mobile device 102 is positioned proximate to the reader device 108 by the robot 104 to initiate a fail transaction. As a result, fail tone 702 is emitted by the reader device 108 and captured by the microphone 106 of the testing system. The fail threshold 606 can be generated from the fail tone 702, and each of the fail threshold 606 and the fail tone 702 can be used thereafter during testing of the same reader device 108. Subsequently, the mobile device 102 can be positioned proximate to the reader device 108 by the robot 104 to initiate a fail transaction.

As a result, a tone 706 is emitted, as illustrated in plot 704 of FIG. 7B. The tone 706 can represent audio captured by the microphone 106 when noise, a low amplitude tone, or no tone is emitted by the reader device 108. It should be noted that each of the plots discussed herein may vary in scale with respect to amplitude and time. Upon the tone 706 being captured for analysis by the testing system, a cross-correlation of the fail tone 702 and the tone 706 can be performed by the computer 110. Plot 708 of FIG. 7C illustrates a waveform 710 resulting from the cross-correlation of the fail tone 702 and the tone 706. According to plot 708, the amplitude of the waveform 710 never reaches or exceeds the fail threshold 606 indicating that the tone 706 is not a fail tone. As a result, if the transaction that caused the tone 706 to be emitted by the reader device 108 was intended to be a fail transaction, then the testing system can update the log to indicate that the fail transaction was not successful. In response, the testing system can repeat the testing of the mobile device 102 with the reader device 108 until a successful fail transaction occurs. Alternatively, the computer 110 can direct the robot 104 to maneuver the mobile device 102 proximate to the next reader device 108 to be tested for inter-operability. This process can be repeated until a desired number of reader devices 108 are tested for inter-operability with the mobile device 102, and/or until the mobile device 102 is determined to be operable with the reader device 108. A mobile device 102 can be determined as operable with a reader device 108 when a successful pass transaction and/or a successful fail transaction occurs. However, it should be noted that other types of transactions can be tested by the testing system, such as those transactions involving other non-NFC wireless circuits, and/or a remote device such as a server, antenna, power supply, or any other suitable device directly or indirectly related to wireless transactions.

Figure 8:
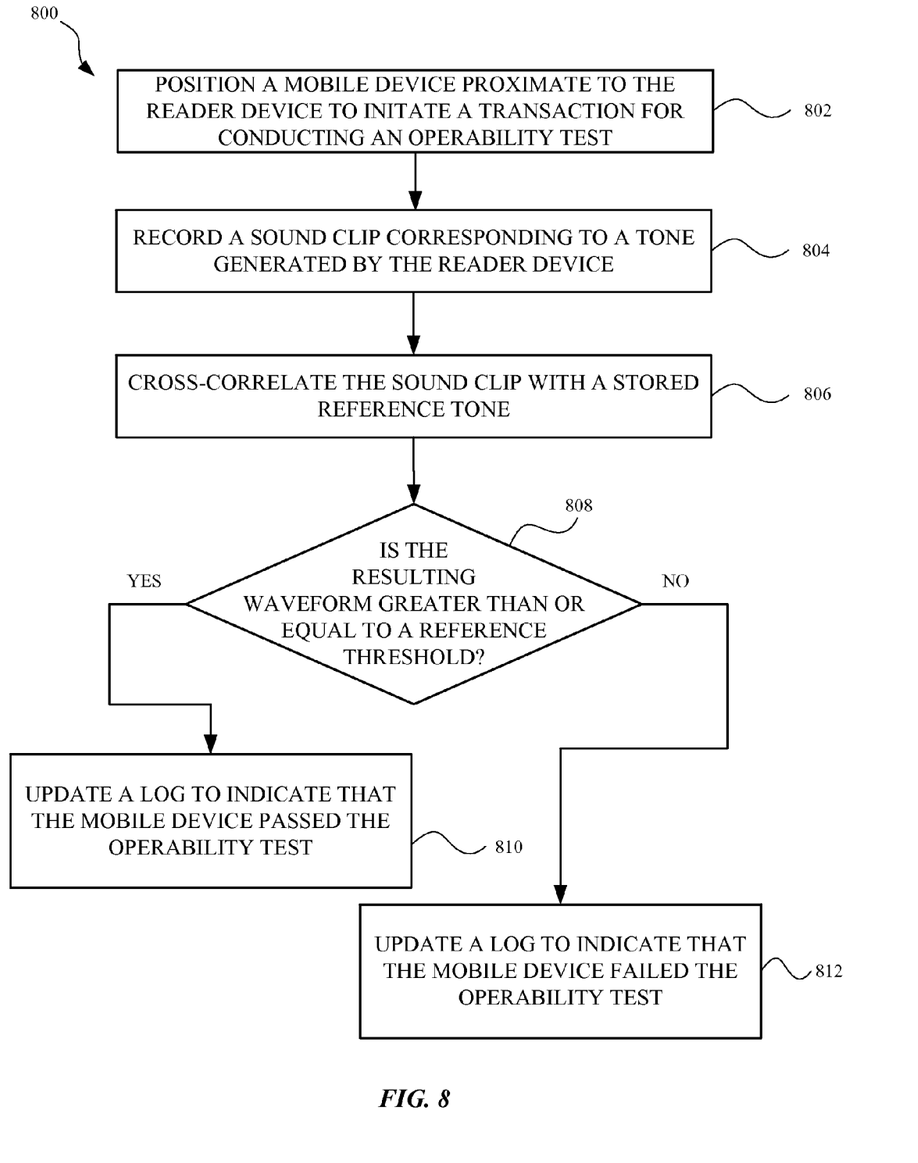
FIG. 8 illustrates a method for automatically performing inter-operability testing using the testing system discussed herein.

FIG. 8 illustrates a method 800 for automatically performing inter-operability testing using the testing system discussed herein. The method 800 can be used at least with reader devices 108 programmed to output a pass tone, a fail tone, or both a pass tone and a fail tone. For example, a reader device 108 can output a fail tone when a transaction is initiated but fails to be completed, as discussed herein. A pass tone and/or a fail tone, and a pass threshold and/or fail threshold can be stored in a look-up table that is referenced by the computer 110 of the testing system. The method 800 can include a step of positioning the mobile device 102 proximate to the reader device 108 by a robot 104 to initiate a transaction for conducting an operability test. At step 804, a sound clip generated by the reader device 108 is recorded by a microphone 106 in response to the initiation of the transaction. At step 806, a cross-correlation of the sound clip and a stored reference tone is performed by the computer 110. The reference tone can refer to a pass tone, fail tone, or other tone previously stored by the computer 110, as further discussed herein. Thereafter, a determination is made at step 808 whether the waveform resulting from the cross-correlation is greater than or equal to a reference threshold. The reference threshold can be a pass threshold, fail threshold, or other threshold stored in a look-up table that was previously generated, as further discussed herein. If the resulting waveform is equal to or greater than the reference threshold then, at step 810, a log is automatically updated with an indication that the mobile device 102 passed the operability test. If the resulting waveform is less than the reference threshold then, at step 812, the log is automatically updated with an indication that the mobile device 102 failed the operability test. The method 800 can be used to automatically test multiple different reader devices with multiple different mobile devices. Additionally, the method 800 can test a pass transaction, fail transaction, or any other suitable transaction that can be characterized as having a reference tone.

Figure 9:
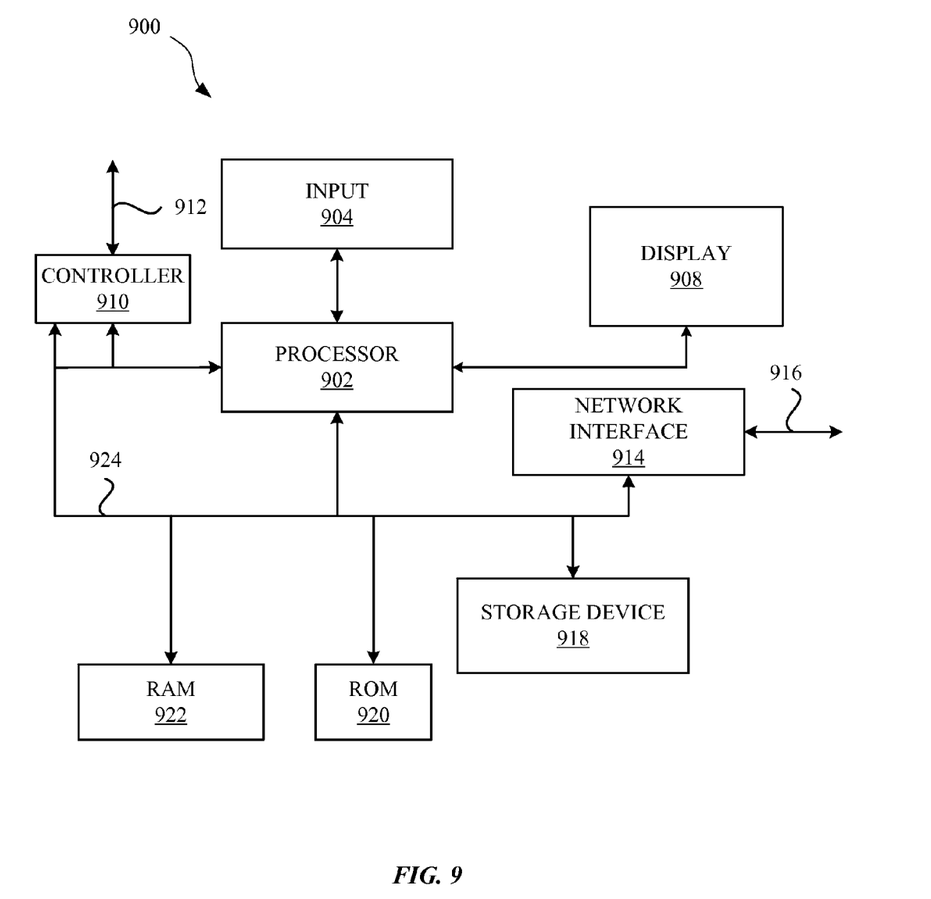
FIG. 9 is a block diagram of a computing device that can represent the components of the testing system, the computer, and/or any other device suitable for conducting the methods and steps discussed herein.

FIG. 9 is a block diagram of a computing device 900 that can represent the components of the testing system, the computer 110, and/or any other device suitable for conducting the methods and steps discussed herein. It will be appreciated that the components, devices or elements illustrated in and described with respect to FIG. 9 may not be mandatory and thus some may be omitted in certain embodiments. The computing device 900 can include a processor 902 that represents a microprocessor, a coprocessor, circuitry and/or a controller for controlling the overall operation of computing device 900. Although illustrated as a single processor, it can be appreciated that the processor 902 can include a plurality of processors. The plurality of processors can be in operative communication with each other and can be collectively configured to perform one or more functionalities of the computing device 900 as described herein. In some embodiments, the processor 902 can be configured to execute instructions that can be stored at the computing device 900 and/or that can be otherwise accessible to the processor 902. As such, whether configured by hardware or by a combination of hardware and software, the processor 902 can be capable of performing operations and actions in accordance with embodiments described herein.

The computing device 900 can also include user input device 904 that allows a user of the computing device 900 to interact with the computing device 900. For example, user input device 904 can take a variety of forms, such as a button, keypad, dial, touch screen, audio input interface, visual/image capture input interface, input in the form of sensor data, etc. Still further, the computing device 900 can include a display 908 (screen display) that can be controlled by processor 902 to display information to a user. Controller 910 can be used to interface with and control different equipment through equipment control bus 912. The computing device 900 can also include a network/bus interface 914 that couples to data link 916. Data link 916 can allow the computing device 900 to couple to a host computer or to accessory devices. The data link 916 can be provided over a wired connection or a wireless connection. In the case of a wireless connection, network/bus interface 914 can include a wireless transceiver.

The computing device 900 can also include a storage device 918, which can have a single disk or a plurality of disks (e.g., hard drives) and a storage management module that manages one or more partitions (also referred to herein as "logical volumes") within the storage device 918. In some embodiments, the storage device 918 can include flash memory, semiconductor (solid state) memory or the like. Still further, the computing device 900 can include Read-Only Memory (ROM) 920 and Random Access Memory (RAM) 922. The ROM 920 can store programs, code, instructions, utilities or processes to be executed in a non-volatile manner. The RAM 922 can provide volatile data storage, and store instructions related to components of the storage management module that are configured to carry out the various techniques described herein. The computing device 900 can further include data bus 924. Data bus 924 can facilitate data and signal transfer between at least processor 902, controller 910, network interface 914, storage device 918, ROM 920, and RAM 922.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for performing inter-operability testing of a near-field communications (NFC) device using a testing system, the method comprising steps that include:
   processing a tone generated by a reader device as a result of a wireless transaction between the NFC device and the reader device;
   combining the tone with a pre-recorded pass tone to generate a resulting waveform;

comparing a peak of the resulting waveform to a pass tone threshold; and when the peak is equal to or greater than the pass tone threshold, determining that the NFC device is operable with the reader device.

2. The method as in claim 1, wherein the pass tone threshold is based on an auto-correlation of the pre-recorded pass tone.

3. The method as in claim 2, wherein the pass tone threshold is less than an amplitude of a signal that is generated as a result of the auto-correlation.

4. The method as in claim 1, wherein combining the tone with the pre-recorded pass tone comprises cross-correlating the tone with the pre-recorded pass tone.

5. The method as in claim 1, wherein the steps further include:

prior to combining the tone with the pre-recorded pass tone, determining whether an entry for the pre-recorded pass tone exists in a look-up table managed by the testing system.

6. The method as in claim 5, wherein the steps further include:

when the entry does not exist in the look-up table, auto-correlating the tone and generate the pass tone threshold based on an amplitude of the auto-correlated tone.

7. The method as in claim 1, wherein the steps further include:

when the peak is at least equal to the pass tone threshold, generating a fail tone threshold based on a peak of an auto-correlation of the tone; and storing the tone as a pre-recorded fail tone.

8. A computing device for performing inter-operability testing of a near-field communication (NFC) device with a reader device, the computing device comprising:

a processor; and a memory configured to store instructions that when executed by the processor cause the computing device to perform steps that include:

receiving, via a microphone communicatively coupled to the computing device, a captured tone resulting from a transaction between the NFC device and the reader device; and determining that the NFC device is operable with the reader device when a peak of a signal derived from a combination of the captured tone and a pre-recorded tone is within a threshold range.

9. The computing device as in claim 8, wherein the combination of the captured tone and the pre-recorded tone is a cross-correlation of the captured tone and the pre-recorded tone, and the threshold range is based on an amplitude of an auto-correlation of the pre-recorded tone.

10. The computing device as in claim 8, wherein the steps further include:

performing an auto-correlation of the pre-recorded tone;

selecting a reference value that is less than an amplitude of a waveform resulting from the auto-correlation; and setting the threshold range to be any value equal to or greater than the reference value.

11. The computing device as in claim 8, wherein the steps further include:

sending control instructions to a robotic device configured to control a location of the NFC device proximate to the reader device.

12. The computing device as in claim 11, wherein the steps further include:

storing data corresponding to the location of the NFC device in order to track operability of the NFC device at different locations relative to the reader device.

13. The computing device as in claim 8, wherein the steps further include:

updating a look-up table stored in the memory, wherein the look-up table includes an entry corresponding to the reader device being tested.

14. The computing device as in claim 13, wherein the look-up table further includes:

at least one threshold value corresponding to a pass threshold or fail threshold for at least one reader device.

* * * * *